United States Patent
Wachtler et al.

(10) Patent No.: US 12,369,584 B2
(45) Date of Patent: Jul. 29, 2025

(54) FUNGICIDE MIXTURES

(71) Applicant: LANXESS Deutschland GmbH, Cologne (DE)

(72) Inventors: Peter Wachtler, Krefeld (DE); Hermann Uhr, Leverkusen (DE); Roland Stopp, Leverkusen (DE)

(*) Notice: Subject to any disclaimer, the term of this patent is extended or adjusted under 35 U.S.C. 154(b) by 596 days.

(21) Appl. No.: 17/769,834

(22) PCT Filed: Oct. 13, 2020

(86) PCT No.: PCT/EP2020/078775
§ 371 (c)(1),
(2) Date: Apr. 18, 2022

(87) PCT Pub. No.: WO2021/074149
PCT Pub. Date: Apr. 22, 2021

(65) Prior Publication Data
US 2022/0394976 A1    Dec. 15, 2022

(30) Foreign Application Priority Data

Oct. 16, 2019  (EP) ..................... 19203468

(51) Int. Cl.
| | | |
|---|---|---|
| *A01N 43/78* | (2006.01) | |
| *A01N 25/04* | (2006.01) | |
| *A01N 25/34* | (2006.01) | |
| *A01N 43/36* | (2006.01) | |
| *A01N 43/54* | (2006.01) | |
| *A01N 43/56* | (2006.01) | |
| *E04F 13/08* | (2006.01) | |

(52) U.S. Cl.
CPC ............. *A01N 43/78* (2013.01); *A01N 25/04* (2013.01); *A01N 25/34* (2013.01); *A01N 43/36* (2013.01); *A01N 43/54* (2013.01); *E04F 13/0875* (2013.01)

(58) Field of Classification Search
CPC ........ A01N 43/78; A01N 25/04; A01N 25/34; A01N 43/36; A01N 43/54
See application file for complete search history.

(56) References Cited

U.S. PATENT DOCUMENTS

| | | | |
|---|---|---|---|
| 7,695,951 B2 | 4/2010 | Vafai et al. | |
| 8,138,196 B2 | 3/2012 | Cornish et al. | |
| 9,220,725 B2 | 12/2015 | Krishnan | |
| 2006/0009535 A1 | 1/2006 | Wantling | |
| 2008/0280929 A1* | 11/2008 | Cornish | A01N 43/78 514/269 |
| 2008/0300313 A1* | 12/2008 | Byrne | A01N 25/02 514/611 |
| 2009/0151024 A1* | 6/2009 | Dietz | A01N 43/56 514/354 |
| 2009/0221619 A1 | 9/2009 | Cornish et al. | |
| 2009/0297571 A1* | 12/2009 | Cornish | A01N 43/36 514/383 |
| 2015/0327556 A1* | 11/2015 | Brahm | A01N 25/00 504/117 |

FOREIGN PATENT DOCUMENTS

| | | |
|---|---|---|
| CN | 1 759 674 A | 4/2006 |
| DE | 4318372 A1 | 12/1993 |
| EP | 2499911 A1 | 9/2012 |
| WO | 2008115934 A1 | 9/2008 |

OTHER PUBLICATIONS

B. Andersen et al. (2017) in "Pre-contamination of new gypsum wallboard with potentially harmful! fungal species", Indoor Air, 27(1), 6-12, available from the Internet at www.orbit.dtu.dk.
International Search Report from corresponding International Application No. PCT/EP2020/078775, dated Feb. 4, 2012, three pages.
Kull, F. C. et al., Appl. Microbial. 9, 538 (1961), pp. 538-541.

* cited by examiner

*Primary Examiner* — Jianfeng Song

(57) ABSTRACT

The invention refers to a fungicide mixture comprising the biocides thiabendazole (TBZ), pyrimethanil (PYM) and fludioxonil (FDL), wherein the total amount of FDL based on the entire amount of biocidal actives is greater than 2 wt. %.

8 Claims, No Drawings

FUNGICIDE MIXTURES

The present invention relates to a fungicide mixture, its manufacturing and wallboards containing the same for inhibiting or preventing the growth of mold, mildew and fungi.

The fungi of relevance to the invention are those which are capable of growing on building materials such as wallboards. Fungi are versatile organisms and the substrates on which they grow can include building materials since such materials can be made of, or have applied to them, substances which support fungal growth. Fungal growth generally requires dampness, that can be caused on building materials by, for example, internal water leaks or external leaks, or by areas of high humidity or condensation. Fungal growth also requires a food source which, in this case, can be the building material itself or can be dirt or other nutritious material present on the building material.

Fungi which are capable of growing on building materials such as wallboards have been problematic for some time. Obvious effects of such fungi are discoloration of the material on which they grow, often accompanied by unpleasant smells. Fungi also contribute to the physical destruction of the material. In recent years, such fungi have also been an increasing cause for concern in relation to human health. Various health problems have been attributed to such fungi with most common being allergic reactions and in some cases, human infections. Certain fungi which are capable of growing on such building materials are also thought to be carcinogenic. Clearly these fungi are perceived as a growing threat to human health and it is important to prevent mold and mildew growth Fungi are at least in part responsible for so-called 'black mould', a fungal infestation of buildings. Wallboard is particularly susceptible to black mould, which has become a significant problem in buildings in some areas, and which has been blamed for a range of human health problems. Fungi are also responsible for facilitating discoloration of the material on which they grow and are a particular problem in residential buildings.

In US20060009535 preservatives based on benzimidazoles like thiabendazole (TBZ) as wax emulsions have been proposed for preparing wallboards to resist the attack or growth of such microorganisms, in particular of fungi. However, it was found that even such beneficial treatment with TBZ will not fulfill the growing demand for a broad spectrum antimicrobial agent with higher resistance against microorganisms that can be added to building materials which are subject to mold and mildew attack.

In WO2008/024509 cationic latex polymers as biocidal carrier are disclosed and being applied to wallboard paper as coating or used in the wet end process for making paper for wallboard facing layers. The exemplified actives are actives like tebuconazole, propiconazole or zinc pyrithione. The drawback of such latex polymers is however, that they seal a paper surface through which then water cannot be removed anymore during the drying process of the instantly made wallboard with still high water contents in the gypsum core. Furthermore a cationic charged latex polymer is difficult to combine with typically anionic auxiliaries.

In WO2006/134347 a mixture containing the actives azoxystrobin and thiabendazole has been proposed for preparing respective wallboards to resist the attack or growth of such microorganisms, in particular of fungi. Even more improved is a mixture containing additionally fludioxonil (hereinafter referred to as "FDL").

Although they all perform very well under standard conditions which in case of wallboards is the test according to ASTM G21 of 2009 (=ASTM G21-09), however, it was found that in particular for *Neosartorya hiratsukae* (=*Aspergillus hiratsukae*) such a 3 active mixture will not fulfill the growing demand for a broad spectrum antimicrobial agent with higher resistance against this microorganism observed on building materials which are subject to mold and mildew attack.

*Neosartorya hiratsukae* as it was recently reported by B. Andersen et al. (2017) in "Pre-contamination of new gypsum wallboard with potentially harmfull fungal species", Indoor Air, 27(1), 6-12. COI: 10.1111/ina.12298 was the most dominant fungus, so it gets more important to have high resistance over this fungus.

Hence, the object of the present invention was to provide fungicide mixtures with a further improved capability to resist such attacks by or growth of microorganisms, in particular against *Neosartorya hiratsukae* on wallboards.

Fungicide Mixture

Surprisingly it was found that a fungicide mixture comprising the biocides thiabendazole (TBZ), pyrimethanil (PYM) and fludioxonil (FDL), wherein the total amount of FDL based on the entire amount of biocidal actives is greater than 2 wt. % show improved properties compared to known mixtures like TBZ, AZO and FDL in particular when applied to wallboards.

Antimicrobial Actives

The active substance thiabendazole (in the following also referred to as TBZ) is represented by the following formula and is already known under the CAS number 148-79-8 and for agricultural applications from EP2499911 or for gypsum boards from US20060009535.

Formula of Thiabendazole:

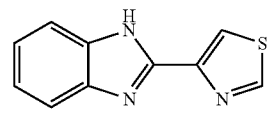 [SMILES: c1ccc2[nH]c(-c3cscn3)nc2c1]

The active substance pyrimethanil (in the following also referred to as PYM) is represented by the following formula and is already known under the CAS number 53112-28-0.

Formula of Pyrimethanil:

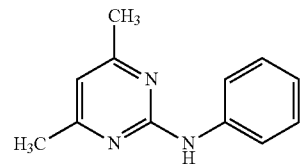

The active substance fludioxonil (in the following also referred to as FDL) is represented by the following formula and is already known under the CAS number 131341-86-1.

Formula of Fludioxonil:

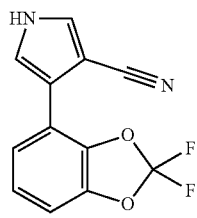 [SMILES: N#Cc1c[nH]cc1-c1cccc2c1OC(F)(F)O2]

In a preferred embodiment of the fungicide mixture the weight ratio of the biocides TBZ and PYM are in the range of 20:1 to 1:20, in particular 10:1 to 1:5, preferably 5:1 to 1:5.

In a preferred embodiment of the present invention the weight ratio of the sum of TBZ and PYM with FDL is from 100:1 to 2:1, in particular from 50:1 to 5:1.

The fungicide mixture of this invention may in addition to TBZ, PYM and FDL contain further compounds having biological activity, for example compounds having similar or complementary fungicidal activity or which possess insecticidal and/or acaricidal and/or algicidal activity. The fungicide can be combined with other fungicides. Combinations with other fungicides can be used to control a broader range of fungi, which is particularly useful if multiple species of fungi are present, or if the species is not known.

The addition of another active ingredient may provide a fungicide mixture having a broader spectrum of activity or increased persistence at a locus, synergize the activity or complement the activity (for example by increasing the speed of effect or overcoming repellency) of the fungicides according to the invention, or help to overcome or prevent the development of resistance to individual components.

Examples of fungicidal compounds which may be additionally included in the fungicide mixture of the invention are:

triazoles such as: azaconazole, azocyclotin, bitertanol, bromuconazole, cyproconazole, diclobutrazole, diniconazole, epoxyconazole, etaconazole, fenbuconazole, fenchlorazole, fenethanil, fluquinconazole, flusilazole, flutriafol, furconazole, hexaconazole, ipconazole, isozofos, myclobutanil, metconazole, paclobutrazol, penconazole, propioconazole, simeconazole, tebuconazole, tetraconazole, triadimefon, triadimenol, triapenthenol, triflumizole, triticonazole, uniconazole and their metal salts and acid adducts; imidazoles such as: clotrimazole, bifonazole, climbazole, econazole, fenapamil, imazalil, isoconazole, ketoconazole, lombazole, miconazole, oxpoconazole, perfurazoate, prochloraz, triflumizole, thiazolcar, and their metal salts and acid adducts; succinate-dehydrogenase inhibitors such as: benodanil, benzovindiflupyr, boscalid, carboxim, carboximsulfoxid, cyclafluramid, fenfuram, flutolanil, fluxapyroxad, furametpyr, furcarbanil, furmecyclox, isofetamid, isopyrazam, mebenil, mepronil, methfuroxam, metsulfovax, nicobifen, oxycarboxin, penthiopyrad, pyrocarbolid, oxycarboxin, pydiflumetofen, seedvax, thifluzamide; benzimidazoles and carbamates such as: Carbendazim; morpholinederivatives such as: aldimorph, dimethomorph, dodemorph, falimorph, fenpropidin, fenpropimorph, flumorph, pyrimorph, tridemorph, trimorphamid and their arylsulfonic acid salts, like p-toluolsulfonic acid and p-dodecylphenyl-sulfonic acid; benzamides such as: 2,6-dichloro-N-(4-trifluoromethylbenzyl)-benzamide, teclofta-lam, zoxamide; boric compounds such as: boric acid, boric acid esters, borax; dicarboximides such as: chlozolinate, dimethachlone, iprodione, procymidone, vinclozolin; isothiazolinones such as: 4,5-dichloro-N-octylisothiazolin-3-one, N-octyl-isothiazolin-3-one, iodo derivatives such as: diiodomethyl-p-tolylsulfone, 3-iodo-2-propinyl-alcohol, 4-chlorophenyl-3-iodopropargyl-formal, 3-bromo-2,3-diiodo-2-propenyl-ethylcarbamate, 2,3,3-triiodo-allylalcohol, 3-bromo-2,3-diiodo-2-propenylalcohol, 3-iodo-2-propinyl-n-butylcarba-mate, 3-iodo-2-propinyl-n-hexylcarbamate, 3-iodo-2-propinyl-cyclohexylcarbamate, 3-iodo-2-propinyl-phenyl-carbamate; phenoles such as: triclosan, diclosan, hexachlorophen, p-hydroxybenzoic acid ester, o-phenylphenol, m-phenylphenol, p-phenylphenol, 4-(2-tert.-butyl-4-methyl-phen-oxy)-phenol, 4-(2-isopropyl-4-methyl-phenoxy)-phenol, 4-(2,4-dimethyl-phenoxy)-phenol, 4-tert.-amyl-phenol and their alkali- and alkaline earth salts; pyridines and pyrimidines such as: buthiobate, fenarimol, 1-hydroxy-2-pyridinthion (and their Cu-, Na-, Fe-, Mn-, Zn-salts), mepanipyrin, nuarimol, tetrachloro-4-methylsulfonylpyridine, mepanipyrim, dipyrithion, 1-hydroxy-4-methyl-6-(2,4,4-trimethylpentyl)-2(1H)-pyridine, pyroxyfur, pyrifenox, pyrisoxazole; methoxy-acrylates or similar compounds such as: coumoxystrobin, dimoxystrobin, enoxastrobin, famoxadone, fenaminstrobin, flufenoxystrobin, kresoxim-methyl, metominostrobin, orysastrobin, praoxystrobin, pyraclostrobin, pyrametostrobin, pyribencarb, triclopyricarb, 2,4-dihydro-5-methoxy-2-methyl-4-[2-[[[[1-[3-(trifluoromethyl)phenyl]-ethylidene]amino]-oxy]methyl] phenyl]-3H-1,2,4-triazol-3-one (CAS-Nr. 185336-79-2)

metal soaps such as: salts of metals tin, copper and zinc with higher fatty acids, resins-, naphthenoic acids and phosphoric acid such as tin-, copper-, zincnaphtenate, -octoate, 2-ethylhexanoate, -oleate, phosphate, -benzoate; oxides such as: oxides of the metals tin, copper and zinc, such as, for example, tributyltin oxide, $Cu_2O$, CuO, ZnO; dithiocarbamates such as: cufraneb, ferban, sodium-N-hydroxymethyl-N'-methyl-dithiobarbamate, Na-oder K-dimethyldithiocarbamate, mancozeb, maneb, metam, metiram, thiram, zineb, ziram; pyrroles such as: fenpiclonil, nitriles such as: 2,4,5,6-tetrachloroisophthalodinitrile, other fungicides such as: ametoctradin, amisulbrom, aethozaxin, benthiavalicarb, bupirimate, dimethirimol, ethirimol, etridiazole, cyazofamid, ethaboxam, iprovalicarb, fenpyrazamine, fluazinam, spiroxamine, carpropamid, diflumetorin, quinoxyfen, oxadxyl, ofurace, polyoxorim, polyoxin, piperalin, propamocarb, prothiocarb, acibenzolar-S-methyl, pencycuron, phenamacril thifluzamide, methalaxyl-M, benalaxyl-M, furalaxyl, benthiavalicarb, metrafenone, cyflufenamid, tiadinil, teatree oil, silthiofam, tolfenpyrad, triforine, fenarimol, nuarimol, pyributicarb, valifenalate, most preferrable are fungicides such as: azaconazole, bromuconazole, cyproconazole, dichlobutrazol, diniconazole, hexaconazole, metconazole, penconazole, propiconazole, triadimefon, fenpiclonil, butenafine, imazalil, N-octylisothiazolin-3-one, zinc-pyrithione, sodium-pyrithione and/or 3-iodo-2-pro-pinyl-n-butylcarbamate.

However, in the fungicide mixture of the present invention the total amount of TBZ, PYM and FDL based on the entire amount of biocidal actives preferably is more than 80 wt.-%, preferably more than 90 wt.-%, in particular more than 95 wt.-%, even more preferred more than 99 wt.-%, even more preferred greater than 99.5 wt. %, in particular more than 99.9 wt. %.

The remaining preferably less than 1 wt. %, in particular less than 0.5 wt. %, more preferably less than 0.1 wt. % of the total amount of biocidal actives is preferably a preservative for the fungicide mixture or its formulation itself also referred to as in-can preservatives. Such a preservative is preferably one or more actives selected from the group consisting of N-Methyl-isothiazolin-3-one, 5-Chloro-N-methyl-isothiazolin-3-one, Benzisothiazolin-3-one (BIT), 2-Bromo-2-nitro-1,3-propandiol (Bronopol), 2,2-Dibromo-3-nitril-propionamid (DBNPA), 1,2-Dibrom-2,4-dicyanobutan (DBDCB) or formaldehyde releasing compounds in particular 1,3-Bis(hydroxymethyl)-5,5-dimethylimidazolidine-2,4-dione (DMDMH), Tetramethylol-acetylen-diurea (TMAD), Ethylenedioxydimethanol (EDDM) and (Benzyloxy)methanol.

In a preferred embodiment the total amount of TBZ, PYM and FDL based on the entire amount of biocidal actives is 100 wt. %.

The preferred average particle size of the biocidal actives in the mixture, preferably of TBZ, PYM and FDL is smaller than 100 μm, preferably smaller than 50 μm and most preferably smaller than 30 μm, measured in accordance with CIPAC MT 187 (laser diffraction).

Further Ingredients

The fungicide mixture of the present invention is preferably an aqueous suspension containing the biocidal actives in an amount of 1 to 60 wt. %, in particular from 11 to 60 wt. %, more preferred from 20 to 60 wt %, most preferred from 30 to 50 wt. %.

Preferably the mixture is a water based suspension having a biocidal active content of 20 to 60 wt. %, which is hereinafter also referred to as "concentrate".

Preferably 80 to 99 wt. %, in particular 89 to 94. wt. %, more preferred 89 to 94.5 wt. % being the sum of biocidal actives and water.

The fungicide mixture may include one or more additives to improve the properties of the mixture (for example by improving wetting, retention or distribution on surfaces; or absorption into surfaces, or the stability as such). For the additives specified below, preferably dispersants, defoamers, wetting agents, buffer substances and thickeners may be used whereby there is in each case independently of one another also the possibility that they are not present.

Surfactants which are preferably understood to be compounds that lower the surface tension (or interfacial tension) between two liquids, between a gas and a liquid, or between a liquid and a solid. Surfactants may be, for example, non-ionic, anionic, cationic and amphoteric surfactants.

Anionic surfactants are, for example, alkyl sulphates, alkyl ether sulphates, alkyl-arylsulphonates, alkyl succinates, alkyl sulphosuccinates, N-alkoyl sarcosinates, acyl taurates, acyl isethionates, alkyl phosphates, alkyl ether phosphates, alkyl ether carboxylates, alpha-olefinsulphonates, in particular the alkali metal and alkaline earth metal salts, for example sodium, potassium, magnesium, calcium, and also ammonium and triethanolamine salts. The alkyl ether sulphates, alkyl ether phosphates and alkyl ether carboxylates can in each case have for example from 1 to 10 ethylene oxide or propylene oxide units, preferably 1 to 3 ethylene oxide units. Sodium lauryl sulphate, ammonium lauryl sulphate, sodium lauryl ether sulphate, ammonium lauryl ether sulphate, sodium lauryl sarcosinate, sodium oleyl succinate, ammonium lauryl sulphosuccinate, sodium dodecyl benzenesulphonate, triethanolamine dodecylbenzenesulphonate, for example, are suitable.

Nonionic surfactants are, for example, alkylaryl polyglycol ethers, such as polyoxyethylene octylphenol ether, ethoxylated isooctyl-, octyl- or nonylphenol, alkylphenol or tributylphenyl polyglycol ethers, trissteryl phenyl ether ethoxylates, alkylaryl polyether alcohols, isotridecyl alcohol, polyoxyethylene-fatty alcohol ethers, polyoxyethylene-fatty acid esters such as, for example, ethoxylated castor oil, polyoxyethylenealkyl ethers or polyoxypropylene, lauryl alcohol polyglycol ether acetate, sorbitol esters or block copolymers based on ethylene oxide and/or propylene oxide.

Further surfactants are for example, sodium, potassium and ammonium salts of straight-chain aliphatic carboxylic adds of chain length $C_{10}$-$C_{20}$. Sodium hydroxyoctadecanesulphonate, sodium, potassium and ammonium salts of hydroxy fatty adds of chain length $C_{10}$-$C_{20}$ and their sulphation or acetylation products, alkyl sulphates, also as triethanolamine salts, alkyl-($C_{10}$-$C_{20}$)-sulphonates, alkyl-($C_{10}$-$C_{20}$)-arylsulphonates, dimethyldialkyl-($C_8$-$C_{18}$)-ammonium chloride, acyl, alkyl, oleyl and alkylaryl oxethylates and their sulphation products, alkali metal salts of sulphosuccinc acid esters with aliphatic saturated monohydric alcohols of chain length $C_4$-$C_{18}$, sulphosuccinic acid 4-esters with polyethylene glycol ethers of monohydric aliphatic alcohols of chain length $C_{10}$-$C_{12}$ (disodium salt), sulphosuccinic acid 4-esters with polyethylene glycol nonyl phenyl ether (disodium salt), sulphosuccinic acid bis-cyclohexyl ester (sodium salt), ligninosulphonic acid, and calcium, magnesium, sodium and ammonium salts thereof, polyoxyethylene sorbitan monooleate with 20 ethylene oxide groups, resin acids, hydrogenated and dehydrogenated resin acids, and alkali metal salts thereof, dodecylated diphenyl ether disulphonic acid sodium, and copolymers of ethylene oxide and propylene oxide with a minimum content of 10% by weight ethylene oxide. Preferably, the surfactants used are: sodium lauryl sulphate, sodium lauryl ether sulphate, ethoxylated (3 ethylene oxide groups); the polyethylene glycol (4-20) ethers of oleyl alcohol, and the polyethene oxide (4-14) ethers of nonylphenol.

The defoamers used are generally interface-active substances which are weakly soluble in the surface-active solution. Preferred antifoams are those which are derived from natural fats and oils, petroleum derivatives or silicone oils. Preferred examples are oil based defoamers based on mineral oil, vegetable oil or white oil. Silicone based defoamers as an oil or a water based emulsion, silicone oil, silicone glycols, poly-dimethylsiloxane, fluorosilicones and other modified silicone fluids. Also preferred are EO/PO based defoamers that are based on polyethylene glycol and/or polypropylene glycol copolymers as oil, water solutions, or water based emulsions.

Wetting agents, such as, for example, alkali metal, alkaline earth metal, ammonium salts of aromatic sulphonic adds, for example lignin-, phenol-, naphthalene- and dibutylnaphthelenesulphonic add, and also of fatty adds, alkyl- and alkylarylsulphonetes, alkyl, lauryl ether and fatty alcohol sulphates, and salts of sulphated hexa-, hepta- and octadecanols or fatty alcohol glycol ethers, condensation products of sulphonated naphthalene and its derivatives with formaldehyde, condensation products of naphthalene or of naphthalene sulphonic adds with phenol and formaldehyde, polyoxyethylene octyl phenol ether, ethoxylated isooctyl-, octyl- or nonylphenol, alkylphenol or tributylphenyl polyglycol ether, trissteryl phenyl ether ethoxylates, alkylaryl polyether alcohols, isotridecyl alcohol, fatty alcohol ethylene oxide condensates, ethoxylated castor oil, polyoxyethylene alkyl ether and polyoxypropylene, lauryl alcohol polyglycol ether acetate, sorbitan esters, or lignosulphite waste liquors.

Buffer substances, buffer systems or pH regulators, like phosphates, weak organic acids like citric acid or borates. Preferred buffering substances are citric acid, acetic acid, monopotassium phosphate, ammonia, N-cyclohexyl-2-aminoethanesulfonic acid, boric acid and borates.

Thickeners, such as, for example, polysaccharides, xanthan gum, sodium or magnesium silicates, heteropolysaccharides, alginates, carboxymethylcellulose, gum arabic or polyacrylic acids, preferably xanthan gum.

Preferably the fungicide mixture of the present invention contains:
the biocidal actives and water and
0.2 to 5 wt. % of at least one dispersant, preferably from 0.2 to 4 wt. %,
0.05 to 5 wt. % thickener, preferably from 0.05 to 1 wt. % and
0 to 1 wt. % defoamer, preferably from 0 to 0.5 wt. %.

The fungicide mixture of the present invention preferably contains less than 1 wt. % of cationic polymer latex, in particular less than 1 wt. % of polymer latex. Also preferred is the fungicide mixture of the present invention that contains less than 5 wt. %, in particular less than 1 wt. % wax.

The mixture of the present invention preferably has a dynamic viscosity 100 to 800 mPas at 30 1/s, measured in accordance with the CIPAC 192 method.

Fungicide mixtures of the present invention are preferably used to make the wallboard according to the present invention can be based on organic solvents and/or can be water based. Organic solvents can have the advantage of being easier to handle, but water-based compositions are preferred because of their lower air pollution potential, and lower odour, particularly for in-door applications in buildings. One example of a suitable water-based composition is a suspension, in particular a suspension concentrate having a content of biocidal actives of 20 to 60 wt. %.

In general, the composition can be chosen from a number of formulation types.

Preferable are wettable powders (WP) that may be prepared by mixing the fungicides with one or more solid diluents or carriers, one or more wetting agents and, preferably, one or more dispersing agents and, optionally, one or more suspending agents to facilitate the suspension in liquids. The mixture is then preferable ground to a fine powder. Similar compositions may also be granulated to form water dispersible granules (WG).

Also preferred are suspension concentrates (SC) that may comprise aqueous or non-aqueous suspensions of finely divided insoluble solid particles of the fungicides according to the invention. SCs may be prepared by ball or bead milling fungicides according to the invention in a suitable medium, optionally with one or more dispersing agents, to produce a fine particle suspension of the compound. The solid content of such a suspension concentrate is preferably in the range of 20 to 60 wt. %. One or more wetting agents may be included in the composition. Alternatively, the fungicides according to the invention may be dry milled and added to water, containing agents hereinbefore described, to produce the desired end product.

The fungicidal mixture of the present invention performs preferably synergistically.

Process

Another subject of the present invention is a process for the manufacturing of fungicide mixture, characterized in that the biocides TBZ, PYM and FDL are mixed.

The method for preparing the fungicide mixture of the present invention, in particular in form of an aqueous suspension, preferably a suspension concentrate comprises the following steps:
a) mixing the biocidal actives TBZ, PYM and FDL, and at least one surfactant and water and optionally a wetting agent, a defoaming agent, an in-can preservatives and/or other biocidal actives,
b) homogenize the mixture under a) preferably by a high speed stirrer in a respective tank or other suitable vessel, in particular with shear forces, preferably high shear,
c) optionally further treat such homogenized mixture under b) in a bead mill to preferably achieve the desired particle size and
d) adding optionally a thickener before, during and/or after the milling step c) preferably in order to adjust the viscosity as desired.

If the particle sizes of the active ingredients TBZ, PYM and FDL are already in the desired range an additional milling c) is not necessary and the whole process can be carried out by mixing and homogenization.

Wallboard

The invention is also related to a wallboard comprising a gypsum core and a facing layer containing the biocides thiabendazole (TBZ), pyrimethanil (PYM) and fludioxonil (FDL), wherein the total amount of FDL based on the entire amount of biocidal actives is greater than 2 wt. %.

Such a wallboard can be effectively protected from infestation by fungi, in particular against *Neosartorya hiratsukae*.

In a preferred embodiment of the fungicide mixture the weight ratio of the biocides TBZ and PYM are in the range of 20:1 to 1:20, in particular 10:1 to 1:5, preferably 5:1 to 1:5.

In a preferred embodiment of the present invention the weight ratio of the sum of TBZ and PYM with FDL is from 100:1 to 2:1, in particular from 50:1 to 5:1.

With regard to the preferred embodiments of the biocides in the wallboard of the present invention the above mentioned features made for the fungicide mixture shall also apply here. The same shall apply for the other ingredients mentioned for the fungicide mixture that will end up in the wallboard.

The wallboard according to the present invention contains the biocidal actives either in the gypsum core of the wallboard, in or on the facing layer, which in particular is paper or in the gypsum core and the facing layer.

Wallboard is generally in the form of a flat sheet, preferably between 0.5 and 5.5 cm thick and usually being a composite of a gypsum core and a facing layer, in particular paper or glass fibre mats. Preferably the wallboard has paper as facing layer whereby the core is covered on both sides (front and back) with paper. The paper generally has a weight of 130-300 $g/m^2$, preferably 150-250 $g/m^2$.

A wallboard is normally used as a building material used to make the internal dividing walls of buildings. Buildings include residential buildings such as houses and flats and commercial buildings such as shops, warehouses, hotels and factories and the like, also institutional buildings such as colleges. Wallboard includes ceiling board which is material used for internal ceilings. Wallboard is usually fixed to a wooden or metal frame to form an internal wall, or fixed to ceiling spars to form an internal ceiling.

Wallboard has many desirable properties, such as being relatively light and easy to cut, and having a surface that is easily decorated with paint or wallpaper. However, wallboard suffers from a particular problem if it is exposed to water and for that reason its use is restricted to internal areas of buildings.

The gypsum core is very water-absorbent, and once it is wet can take a long time to dry out. The combination of a damp gypsum core and preferably starch contained in the core and the cellulose contained in the paper, in case the facing layer is based on paper, provide an ideal substrate for fungi to grow. Essentially, the damp gypsum provides a convenient sustained water reservoir for the fungus while the paper provides nutrition. Even when used internally, wallboards can be exposed to water for example from leaky internal plumbing or from rainwater leaks from the outside of the building, or from sustained high humidity or condensation. Such leaks are unfortunately rather common and as a consequence fungal growth on wallboards is a continuing and widespread problem. Another reason for wallboards becoming wet is insufficient storage and transport.

A wallboard is conventionally produced by enclosing a core of an aqueous slurry of calcined gypsum and optionally other components between one or more facing layers, like cellulose based paper or glass mat. The facing layer may comprise different materials. In one embodiment, the facing layer contains pulp fibers. In this regard, the facing layer may comprise a paper, such as a paperboard. In one embodiment, for instance, the facing layer may be made from recycled pulp fibers, such as recycled newsprint.

Gypsum Core

The gypsum slurry used to make the core of wallboards preferably comprises calcined gypsum alone or in combination with various other materials. In one embodiment, for instance, the core may further include filler materials, soap, dispersant and similar ingredients.

Gypsum is typically obtained naturally from gypsum rock. The gypsum rock is normally ground to a desired fineness and then undergoes calcination. Calcination is performed by heating the gypsum rock in order to remove moisture and produce calcium sulfate hemihydrate. Calcium sulfate hemihydrate, when mixed with water, will set and form the core material.

Other components that can be present in the gypsum core are mentioned in the manufacturing part below as such components are normally already added to the gypsum slurry from which the gypsum core is formed.

The gypsum core is typically greater than 3.175 mm in thickness. The gypsum core can be preferably from 9.5 to 51 mm, in particular from 19 to 32 mm preferably from 13 to 25 mm in thickness.

Paper as Facing Layer

The paper facing can have a basis weight of generally 130 or more g/m$^2$, in particular 150 or more g/m$^2$, such as 170 or more g/m$^2$. The basis weight is generally 300 or less g/m$^2$, such as 270 or less g/m$^2$, such as 250 or less g/m$^2$. In an alternative embodiment, the facing layer paper may comprise starch or a starch layer. In another embodiment, starch may be used to attach a pulp containing facing layer to the core material.

In case paper is used as facing layer, the paper can be used as single or multi-layered facing, whereby, the fungicide can be included in or on any paper layer. Preferably the biocide is included in or on the outer 1 to 3 layers of the multi-layered facing paper.

Amount/Ratio

Even more preferred is a wallboard, wherein the total amount of TBZ, PYM and FDL based on the entire amount of biocidal actives is greater than 99 wt. % in a total amount (comprising in core and paper) from 10 to 1000 ppm, in particular from 20 to 800 ppm.

If only applied to and calculated on the gypsum core of the wallboard the total amount of actives in the wallboard is from 10 to 1000 ppm, preferably from 10 to 800 ppm, even more preferred from 10 to 500 ppm.

When applied only to and calculated on the paper facings, the total amount of actives is from 100 to 3000 ppm, preferably from 200 to 2000 ppm.

Alternatively, if only applied to the gypsum core of the wallboard the total amount of actives in the wallboard based on gypsum/stucco (CaSO$_4$×0.5 H$_2$O) is from 10 to 1000 ppm, preferably from 50 to 1000 ppm, even more preferred from 80 to 1000 ppm, in particular from 150 to 1000 ppm, preferably from 25 to 500 ppm.

The actives may be present in the gypsum core, the facing layer, in particular the paper or in both composite parts.

Fungi/Microorganism

The wallboard of the present invention shows in particular good properties with respect to tested fungus of the ASTM G21 test of 2009 wherein the following fungus are collectively tested: *Aspergillus niger, Aureobasidium pullulans, Chaetomium globosum, Gliocladium virens* and *Penicillium pinophilium* as well as for *Neosartorya hiratsukae*.

Process for Making Wallboards

The present invention still further provides a method for making the wallboard of the present invention, wherein the wallboard is treated with the fungicide mixtures of the present invention or their actives TBZ, PYM and FDL separately wherein the total amount of FDL based on the entire amount of biocidal actives is greater than 2 wt. % and optional further actives that are contained in the fungicide mixture or added separately, during the manufacturing process of said wallboard and/or thereafter. To achieve mold protected wallboards, preferably the fungicide mixture of the present invention is added a) to a gypsum slurry before the gypsum board is formed and/or b) to the surface of the gypsum core of the wallboard before the facing layer, in particular the paper is applied and/or c) to the facing layer making process, in particular the paper making process, preferably to the paper pulp and/or d) to the surface of the facing layer, in particular the finished paper layer.

In case the fungicidal mixture of the present invention is used for protecting the wallboard, the wallboard also can contain the ingredients of the respective mixture, in particular defoamer, thickener, wetting agent, in-can preservative and surfactant in their respective amount.

When producing the wallboard of the present invention, an aqueous slurry of hydrated gypsum and other components is continuously deposited between two facing layers, preferably paper. The gypsum slurry can be prepared using any calcined gypsum including calcium sulfate hemihydrate, calcium sulfate anhydrite or both. Calcium sulfate hemihydrate can produce at least two crystal forms, the alpha and beta forms. Beta or alpha calcium sulfate hemihydrate may be used.

The gypsum slurry preferably contains 30 to 55 wt.-%, preferably from 35 to 45 wt.-% of water.

In some embodiments, additives are included in the gypsum slurry to modify one or more properties of the final product. Such additives can include starches, defoamers, surfactants, dispersants, naphthalene sulfonates or wax emulsions.

A trimetaphosphate compound can be added to the gypsum slurry in some embodiments to enhance the strength of the product and to reduce sag of the set gypsum. The concentration of the trimetaphosphate compound can be from about 0.1 percent to about 2.0 percent based on the weight of the calcined gypsum. Exemplary trimetaphosphate salts include sodium, potassium or lithium salts of trimetaphosphate.

In addition, the gypsum slurry optionally can include a starch, such as a pregelatinized starch or an acid-modified starch. The inclusion of the pregelatinized starch increases the strength of the set and dried gypsum cast and minimizes or avoids the risk of paper delamination under conditions of increased moisture (e.g., with regard to elevated ratios of water to calcined gypsum). The pregelatinized starch can be added to the mixture used to form the set gypsum composition such that it is present in an amount of from 0.5 to 10 percent by weight of the set gypsum slurry.

The present invention still further provides a method as described above in which the fungicides are applied to the gypsum slurry before hardening.

The present invention still further provides a method as described above in which the fungicides are applied to the surface of the gypsum core of the wallboard.

The present invention still further provides a method as described above wherein the fungicides are included in the paper facing of the wallboard. The fungicide may be added during any stage of the paper manufacturing process, including the "wet-end" (e.g. thick stock, thin stock, machine chest, head box), or the "dry-end" after the paper is formed such as by dipping, spraying, or other surface coating techniques known by those skilled in the art (e.g. size press, calender stack, water box, spray bar, off-machine coater).

The present invention still further provides a method as described above wherein the fungicides are applied to the paper after said paper has been made, such as by dipping, spraying, or other surface coating techniques (e.g. size press, calender stack, water box, spray bar, off-machine coater).

The present invention still further provides a method as described above wherein the finished or substantially finished wallboard is treated with the fungicides.

The present invention still further provides a method as described above wherein the wallboard is treated with the fungicides prior to installation of said wallboard.

The present invention still further provides a wallboard obtained by either method as described above.

Application

The invention also refers to the use of the fungicide mixture of the present invention for protecting wallboards against the attack and growth of microorganisms. The protection may be done in the ways as described above.

In a still further aspect of the invention there is provided a method for the prevention and/or treatment of fungal growth/infestation on paper by treating said paper with a fungicide mixture of the present invention.

In a still further aspect of the invention there is provided a paper product containing a fungicide mixture of the present invention. The fungicide mixture may be applied to the material referred to above in a manner as described above and the fungicides may be applied in ratios as defined in the examples. In a still further aspect of the invention there is provided a method for the prevention and/or treatment of fungal growth/infestation on a building material comprising treating said material with a fungicide mixture.

The fungicide mixture may be applied to the building material in a manner as described above and the fungicides may be applied in ratios as defined in the examples.

The invention will now be described with reference to the following examples:

EXAMPLES

The following examples are presented to illustrate the invention and are not meant to limit its scope.

The term synergism is used when the action of a combination of antimicrobial substances is being evaluated. When combining two different actives, several different effects may occur, which usually cannot be foreseen, but have to be determined by adequate testing:

Additive effect
  The additive effect of a combination of antimicrobial substances is one in which the effects of the combination is equal to that of the sum of the effect of the individual components.

Synergistic effect
  Synergistic action of a combination of antimicrobial substances is present if the effect of the combination exceeds the additive effects of the individual components.

Antagonistic effect
  Antagonism is present if a reduced effect of a combination of antimicrobial substances is observed in comparison with the effect of the most effective individual substance.

The synergism found for the mixtures according to the invention can be determined via the following mathematical formula (cf. F. C. Kull, P. C. Elisman, H. D. Sylwestrowicz and P. K. Mayer, Appl. Microbiol. 9, 538 (1961):

$$\text{synergistic index } (SI) = \frac{Q_a}{Q_A} + \frac{Q_b}{Q_B}$$

where
$Q_a$=amount of component A in the active substance mixture which achieves the desired effect, i. e. no microbial growth,
$Q_A$=amount of component A which, when used alone, suppresses the growth of the microorganisms,
$Q_b$=amount of component B in the active substance mixture which suppresses the growth of the microorganisms,
$Q_B$=amount of component B which, when used alone, suppresses the growth of the microorganisms If the sum of the ratios for a mixture $Q_a/Q_A+Q_b/Q_B=1$, additivity is indicated; if it is <1, synergism has occurred; a value of >1 is indicative of antagonism.

Example 1: Synergism of Mixtures of Thiabendazole (TBZ), Pyrimethanil (PYM) and Fludioxonil (FDL)

To determine the antimicrobial efficacy and synergy of active ingredients mixtures, the Minimum Inhibitory Concentration (MIC) of the active substances and their respective combinations were determined. The Minimum Inhibitory Concentration of a given antimicrobial compound or mixture is the lowest concentration expressed in mg/mL (ppm) that under defined in vitro conditions inhibits the growth of a given micro-organism (for example bacteria, mould fungi, yeasts). The growth of the microorganisms is observed on petri dishes containing a defined nutrient agar.

The antimicrobial efficacy and synergy of combinations based on TBZ, PYM and FDL were determined. The results obtained in this experiment are summarized in table 1.

TABLE 1

TBZ/PYM/FDL mixtures - MIC (in ppm) and synergistic indices (SI)

| Fungi tested | TBZ | PYM | FDL | TBZ:PYM:FDL = 1:0.5:0.05 | SI | TBZ:PYM:FDL = 1:0.5:0.1 | SI | TBZ:PYM:FDL = 1:1:0.05 | SI | TBZ:PYM:FDL = 1:1:0.1 | SI |
|---|---|---|---|---|---|---|---|---|---|---|---|
| *Alternaria alternata* | 250 | 25 | 5 | 10 | 0.22 | 5 | 0.14 | 10 | 0.26 | 5 | 0.15 |
| *Aureobasidium pullulans* | 5 | 175 | 1500 | 5 | 0.65 | 5 | 0.63 | 5 | 0.50 | 5 | 0.49 |
| *Chaetomium globosum* | 5 | 250 | 1500 | 5 | 0.71 | 5 | 0.63 | 5 | 0.50 | 5 | 0.51 |
| *Paecilomyces variotii* | 5 | 90 | 175 | 5 | 0.66 | 5 | 0.64 | 5 | 0.52 | 5 | 0.50 |
| *Stachybotris chartarum* | 50 | 100 | 5 | 17.5 | 0.40 | 17.5 | 0.49 | 25 | 0.49 | 7.5 | 0.18 |

As can be seen in table 1, by combination of TBZ, PYM and FDL in different ratios and against various fungal species, noticeable synergistic performance effects, indicated by synergistic indices of <1 are achieved.

Example 2: Gypsum Board Efficacy Testing (Paper Protection)

The fungicide mixtures as of the present invention and of the comparison example to be tested were made as follows:

The respective actives were mixed in their respective weight ratio (see table 2) together with water and 1 wt. % dispersant Tristyrylphenol ethoxylate (in form of Soprophor® S 25), as thickener 0.1 wt. % of Xanthan gum and 1 wt. % wetting agent non-ionic EO/PO-Copolymer (in form of Pluronic 127 F), where the wt. % are based on the entire mixture and were homogenized with a high speed mixer (IKA Ultra Turrax Labor Dispergator) to give an aqueous suspension having a viscosity measured in accordance with CIPAC 192 method of 500-600 mPas and a particle size of the biocides of smaller than 30 μm measured in accordance with the CIPAC 187 method.

Fungicide mixtures as described above of following fungicidal actives were applied to the surface of the facing paper sandwiching the gypsum core (total amount of actives in ppm see table 2):

Thiabendazole (TBZ)
Pyrimethanil (PYM)
Fludioxonil (FDL)
Comparative examples: Thiabendazole/Azoxystrobin (AZO) or rather Thiabendazole/Azoxystrobin (AZO)/Fludioxonil (FDL) mixtures For examination of the antifungal performance of the inventive mixtures testing directly in gypsum boards provides realistic and practically relevant data for evaluation. To achieve such data, gypsum boards were produced in the laboratory.

Preparation of Gypsum Board Samples:

The gypsum board samples were prepared based on a typical slurry recipe

| | |
|---|---|
| Gypsum (dry stucco) (CaSO$_4$ × 0.5 H$_2$O) | 9500 g |
| Tap water | 5700 g |
| Starch | 285 g |

The gypsum slurry is formed by mixing the dry components and the wet components together. The slurry is then mixed to achieve a homogeneous consistency. For sandwiching the gypsum core, the treated cardboard (see below) with a grammage of appr. 180 g/m² was used and after assembly of the plate the hand sheets are dried. The following antifungal compounds and respective formulations were used:

The test wallboards were produced in the lab and tested according to the standard ASTM G 21-09. Differing from the fungi spectrum as typically used by ASTM G 21-09, in this test the efficacy against *Aspergillus hiratsukae* was investigated. According to recent publications (Indoor Air. 2017 January; 27(1):6-12), *Aspergillus hiratsukae* was found to be an important fungus on gypsum wallboards.

In this trial the facing paper was equipped with the fungicidal mixtures as described above. To treat the paper, the fungicides were applied to the surface of the paperboard by means of an electrically driven film applicator device (Erichsen Unicoater), providing films of uniform thickness. The fungicides mixtures prepared above were applied to the coating machines, to achieve homogeneous suspensions well suited for this process step.

For every concentration level, 3 test pieces are used in the test. Each sample is placed in a separate petri dish and then inoculated with a mixed inoculum of the fungi mixture. The closed petri dishes are then incubated at 28-30° C. for 28 days. Pre-reading of the samples may be performed at approximately 10 days after inoculation. The activity of the treatments may be assessed visually, using a rating system of 0-4 for growth inhibition of fungal growth.

| Observed Growth | Rating |
|---|---|
| None | 0 |
| Traces of growth (less than 10%) | 1 |
| Light growth (10 to 30%) | 2 |
| Medium growth (30 to 60%) | 3 |
| Heavy growth (60% to complete coverage) | 4 |

Results: The results as recorded after 4 weeks testing at 28-30° C. according to the requirements of test method ASTM G 21 are summarized in table 2.

TABLE 2

ASTM G 21 testing results for *Aspergillus hiratsukae*
Mixtures of TBZ, PYM and FDL applied to paper surfaces, amount in ppm active ingredients (a.i.) on dry paper (no core treatment)
Tested specifically against test fungi *Aspergillus hiratsukae*

| | a.i.'s in ppm | Rating |
|---|---|---|
| Control sample | 0 | 4 |
| TBZ - AZO 1.3:1 | 175 | 4 |
| TBZ - AZO 1.3:1 | 350 | 4 |
| TBZ - AZO 1.3:1 | 700 | 4 |

TABLE 2-continued

ASTM G 21 testing results for *Aspergillus hiratsukae*
Mixtures of TBZ, PYM and FDL applied to paper surfaces, amount
in ppm active ingredients (a.i.) on dry paper (no core treatment)
Tested specifically against test fungi *Aspergillus hiratsukae*

|  | a.i.'s in ppm | Rating |
| --- | --- | --- |
| TBZ - AZO 1.3:1 | 875 | 3 |
| TBZ - AZO 1.3:1 | 1050 | 3 |
| TBZ -AZO-FDL 1:1:0.1 | 200 | 3 |
| TBZ -AZO-FDL 1:1:0.1 | 400 | 3 |
| TBZ -AZO-FDL 1:1:0.1 | 800 | 1 |
| TBZ -AZO-FDL 1:1:0.1 | 1000 | 1 |
| TBZ -AZO-FDL 1:1:0.1 | 1200 | 0 |
| TBZ -PYM-FDL 1:1:0.1 | 200 | 1 |
| TBZ -PYM-FDL 1:1:0.1 | 400 | 0 |
| TBZ -PYM-FDL 1:1:0.1 | 800 | 0 |
| TBZ -PYM-FDL 1:1:0.1 | 1000 | 0 |
| TBZ -PYM-FDL 1:1:0.1 | 1200 | 0 |

Interpretation of Table 2:

The control sample (untreated paper, no fungicide in the core) exhibits heavy growth of fungi (rating "4"). The TBZ/AZO mixture in the tested concentration range is not good enough to suppress the growth of *Aspergillus hiratsukae*. The comparative TBZ/AZO/FDL mixture in the tested concentration range only at the upper limit of dosage is effective in control of growth of *Aspergillus hiratsukae*. In comparison, the inventive and new TBZ/PYM/FDL mixture is able to control growth of *Aspergillus hiratsukae* at lower dosages, demonstrating the benefit of the new combinations.

TABLE 3

ASTM G 21 testing results
Mixtures of TBZ, PYM and FDL applied to paper surfaces, amount
in ppm active ingredients on dry paper (no core treatment).
Tested against test fungi of ASTM G 21-09. Organisms which are
included in ASTM G 21 comprise *Aspergillus niger* (ATCC 9642),
*Aureobasidium pullulans* (ATCC 15233) *Chaetomium globosum*
(ATCC 6205), *Gliocladium virens* (ATCC 6459) and *Penicillium
pinophilium* (ATCC 11797) (as pure culture but also as mixed

|  | a.i.'s in ppm | Rating |
| --- | --- | --- |
| Control sample | 0 | 4 |
| TBZ -AZO-FDL 1:1:0.1 | 200 | 0 |
| TBZ -AZO-FDL 1:1:0.1 | 400 | 0 |
| TBZ -AZO-FDL 1:1:0.1 | 800 | 0 |
| TBZ -AZO-FDL 1:1:0.1 | 1000 | 0 |
| TBZ -AZO-FDL 1:1:0.1 | 1200 | 0 |
| TBZ -PYM-FDL 1:1:0.1 | 200 | 0 |
| TBZ -PYM-FDL 1:1:0.1 | 400 | 0 |
| TBZ -PYM-FDL 1:1:0.1 | 800 | 0 |
| TBZ -PYM-FDL 1:1:0.1 | 1000 | 0 |
| TBZ -PYM-FDL 1:1:0.1 | 1200 | 0 |

Interpretation of Table 3:

The control sample (untreated paper, no fungicide in the core) exhibits heavy growth of fungi (rating "4"). The gypsum boards manufactured with paper treated with TBZ/AZO/FDL as well as with TBZ/PYM/FDL mixture in the tested concentration range exhibited a good protection against the standard fungi mix as indicated by ASTM G 21-09 test method.

What is claimed is:

1. A fungicide mixture comprising a synergistic fungicidal combination of thiabendazole (TBZ), pyrimethanil (PYM) and fludioxonil (FDL), wherein the total amount of FDL based on the entire amount of biocidal actives is greater than 2 wt. %, and the weight ratio of the sum of TBZ and PYM to FDL is at least 2:1.

2. The fungicide mixture according to claim 1, wherein the weight ratio of the biocides TBZ and PYM are in the range of 20:1 to 1:20.

3. The fungicide mixture according to claim 1, wherein the total amount of TBZ, PYM and FDL based on the entire amount of biocidal actives is greater than 99 wt. %.

4. The fungicide mixture according to claim 1, wherein the mixture is an aqueous suspension containing the biocidal actives in an amount of 1 to 60 wt. %.

5. The fungicide mixture according to claim 1, wherein the sum of biocidal actives and water is 80 to 99 wt. %, based on the mixture.

6. The fungicide mixture according to claim 1, wherein the mixture contains the biocidal actives and water and
0.2 to 5 wt. % of at least one dispersant,
0.05 to 5 wt. % thickener, and
0 to 1 wt. % defoamer.

7. The fungicide mixture according to claim 1, wherein the average particle size of the biocidal actives TBZ, PYM and FDL is smaller than 100 μm.

8. The fungicide mixture according to claim 1, wherein the weight ratio of the sum of TBZ and PYM to FDL is at least 5:1.

* * * * *